(12) United States Patent
Kremar et al.

(10) Patent No.: US 10,578,406 B2
(45) Date of Patent: Mar. 3, 2020

(54) SUSPENDED FLOOR ASSEMBLY

(71) Applicant: Pratt & Miller Engineering and Fabrication, Inc., New Hudson, MI (US)

(72) Inventors: Jason Kremar, Mooresville, NC (US); Kevin R. Kwiatkowski, Ann Arbor, MI (US); Aaron Ward, Charlotte, NC (US); Christopher Watson, Ypsilanti, MI (US)

(73) Assignee: PRATT & MILLER ENGINEERING AND FABRICATION, INC., New Hudson, MI (US)

( * ) Notice: Subject to any disclaimer, the term of this patent is extended or adjusted under 35 U.S.C. 154(b) by 92 days.

(21) Appl. No.: 15/948,344

(22) Filed: Apr. 9, 2018

(65) Prior Publication Data

US 2019/0310054 A1    Oct. 10, 2019

(51) Int. Cl.
  *F41H 7/04*    (2006.01)
  *B62D 25/20*   (2006.01)
  *B62D 39/00*   (2006.01)

(52) U.S. Cl.
  CPC ......... *F41H 7/042* (2013.01); *B62D 25/2009* (2013.01); *B62D 25/2072* (2013.01); *B62D 39/00* (2013.01)

(58) Field of Classification Search
  CPC . F41H 7/042; B62D 25/2009; B62D 25/2072; B62D 39/00
  See application file for complete search history.

(56) References Cited

U.S. PATENT DOCUMENTS

| | | | |
|---|---|---|---|
| 2009/0071739 A1* | 3/2009 | Leonard ............ | B60N 2/01525 180/209 |
| 2012/0043152 A1* | 2/2012 | Jacob-Lloyd ........ | B60G 11/181 180/292 |
| 2016/0082827 A1* | 3/2016 | Koenig ................. | B62D 21/11 180/60 |
| 2018/0058820 A1* | 3/2018 | Kwiatkowski ........... | F41H 5/16 |

FOREIGN PATENT DOCUMENTS

FR    3056183 A1 *  3/2018
JP    2018103952 A  *  7/2018

* cited by examiner

*Primary Examiner* — Lori L Lyjak
(74) *Attorney, Agent, or Firm* — Brinks Gilson & Lione

(57) ABSTRACT

A vehicle has improved energy absorbing capability and occupants have increased blast survivability. The vehicle includes a suspended floor assembly. The floor assembly may be suspended by, at least in part, one or more suspensions arms that have an extendable portion. The floor assembly may also have a yaw plane energy absorber between the floor assembly and a wall of the vehicle.

19 Claims, 6 Drawing Sheets

Center Blast Lower Extremity Injury Predictions [%eIARV]

Results shown as a Percentage of Objective Values

| # | | Occupant Size: | Large Male | Large Male | Center | Small Female | Small Female |
|---|---|---|---|---|---|---|---|
| | | Occupant Gearset: | Grenadier | Driver | Mid Male Rifleman | Small Female Grenadier | Small Female Driver |
| 20 | Injury Criteria | Femur Compressive Force | 1% | 2% | 1% | 5% | 4% |
| 21 | | Femur Bending Moment | 35% | 39% | 55% | 79% | 81% |
| 22 | | Upper Tibia Compressive Force | 20% | 20% | 31% | 44% | 44% |
| 23 | | Tibia Bending Moment | 28% | 16% | 34% | 41% | 41% |
| 24 | | Revised Tibia Index | 40% | 42% | 69% | | |
| 26 | | Lower Tibia Compressive Force | 40% | 42% | 57% | 65% | 66% |

FIG. 6

Offset Blast Lower Extremity Injury Predictions [%eIARV]

Results shown as a Percentage of Objective Values

| # | | Occupant Size: | Large Male | Large Male | Center | Small Female | Small Female |
|---|---|---|---|---|---|---|---|
| | | Occupant Gearset: | Grenadier | Driver | Mid Male Rifleman | Small Female Grenadier | Small Female Driver |
| 20 | Injury Criteria | Femur Compressive Force | 5% | 4% | 4% | 11% | 11% |
| 21 | | Femur Bending Moment | 25% | 27% | 43% | 97% | 85% |
| 22 | | Upper Tibia Compressive Force | 19% | 18% | 25% | 46% | 40% |
| 23 | | Tibia Bending Moment | 27% | 26% | 28% | 47% | 47% |
| 24 | | Revised Tibia Index | | | 55% | | |
| 26 | | Lower Tibia Compressive Force | 38% | 36% | 46% | 70% | 61% |

FIG. 7

SUSPENDED FLOOR ASSEMBLY

STATEMENT OF GOVERNMENT INTEREST

This disclosure was made in part with Government support. The Government may have certain rights in the disclosure.

TECHNICAL FIELD

This disclosure relates to floor assemblies suspended within vehicles; in particular, military vehicles. The suspended floor assemblies may increase energy absorption and work synergistically with other vehicle assemblies to, among other benefits, mitigate the effects of a blast. The floor assemblies disclosed herein may reduce accelerative loads experienced by vehicle occupants. The suspended floor assembly may have unexpected and advantageous results, including increased survivability for occupants without necessarily increasing the overall distance of a lowermost surface of a military vehicle from a top surface of the ground.

BACKGROUND

Military vehicles may be subjected to underbelly threats, such as those from mines, bombs, improvised explosive devices (IEDs). Floor assemblies in military vehicles may absorb energy to reduce the impact to occupants.

Conventionally, a common approach to blast mitigation is to raise the military vehicle further away from the ground. In certain known military vehicles guided by this principle, certain floor assemblies include under-floor energy absorbers. Under-floor energy absorbers are subject to higher accelerations and deformations. Additionally, under-floor energy absorbers consume space between a floor platform and a vehicle underbody that could be used for other purposes. Additionally, in certain known energy absorption systems, energy absorbers perform their duty through buckling, densification, and other modes that can lead to less predictable or less controllable deformation.

In certain energy absorption systems used in military vehicles, unitary or connected energy absorbers are used to absorb energy in multiple directions. However, because a blast event can lead to acceleration at different rates in different directions, such an energy absorber can be less effective than using multiple separate or partially separated energy absorbers for absorbing energy in separate directions. It is desirable to increase survivability where occupants in a vehicle are exposed to acceleration in a plurality of directions.

In certain known apparatuses for mounting energy absorption systems to vehicles, fixed mounts with high stiffness are used to secure such systems to a vehicle structure such as a wall of a hull. Hulls are the main frame or the main body of a vehicle such as a ship or a tank. Such fixed mounts, however, can lead to a higher moment contribution from the mount to the energy absorption system and less predictable behavior in blast events.

Improvements to military vehicles for mitigating blasts are always in need, as are improvements that may increase crew survivability. The disclosure herein may provide at least one improvement alone or in combination with other vehicle structures.

BRIEF DESCRIPTION OF THE DRAWINGS

FIG. 6 shows validated simulation results in a center blast event; and

FIG. 7 shows validated simulation results in an offset blast event.

DETAILED DESCRIPTION

All figures and examples herein are intended to be non-limiting; they are mere exemplary iterations and/or embodiments of the claims appended to the end of this description. Modifications to system, device, the order of steps in processes, etc., are contemplated.

The disclosed suspended floor assemblies are configured to absorb energy, such as the energy from a blast event and protect occupants from energy moving causing the vehicle to accelerate upward as well as from energy causing the vehicle walls to move outwardly and inwardly. For example, the floor assembly may improve energy absorption in vertical, lateral, and/or longitudinal directions, the directions being relative to the vehicle where the longitudinal axis runs from front to back of the vehicle. The disclosed floor assembly configurations may reduce accelerative loads on vehicle occupants. They may also isolate and reduce impact on subsequent energy absorbers (such as seats and blast mats) resulting from a blast event. The configuration may allow for greater predictability and controllability of deformation resulting from a blast event.

Figure 1:
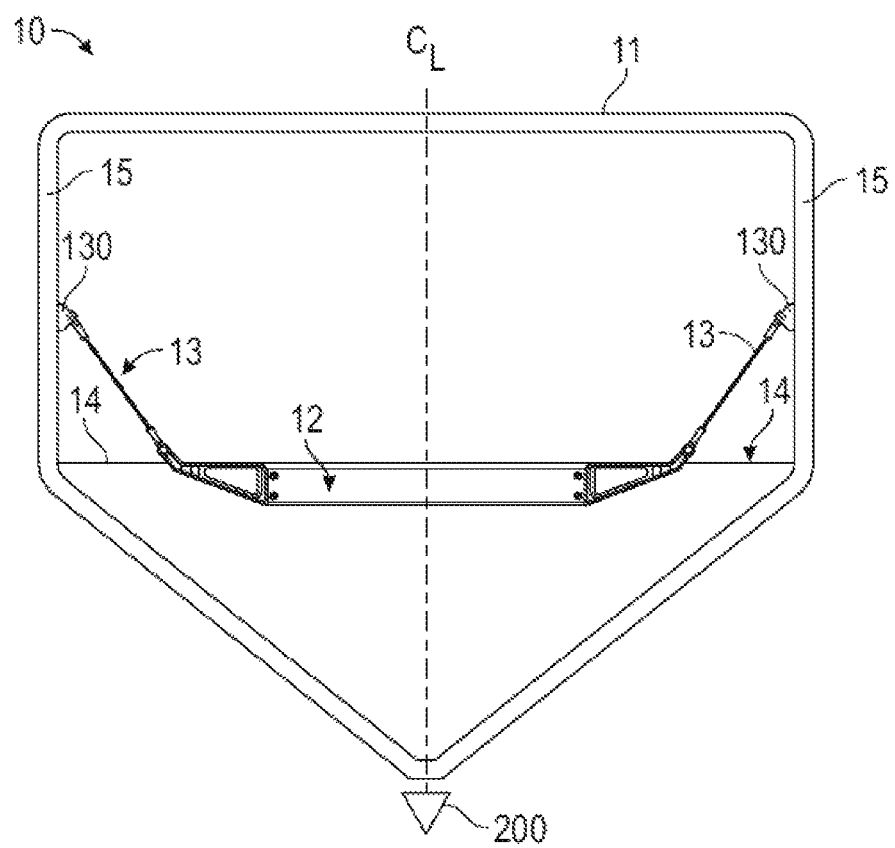
FIG. 1 is a schematic of a cross-section of an exemplary vehicle hull with a suspended floor assembly.
Figure 2:
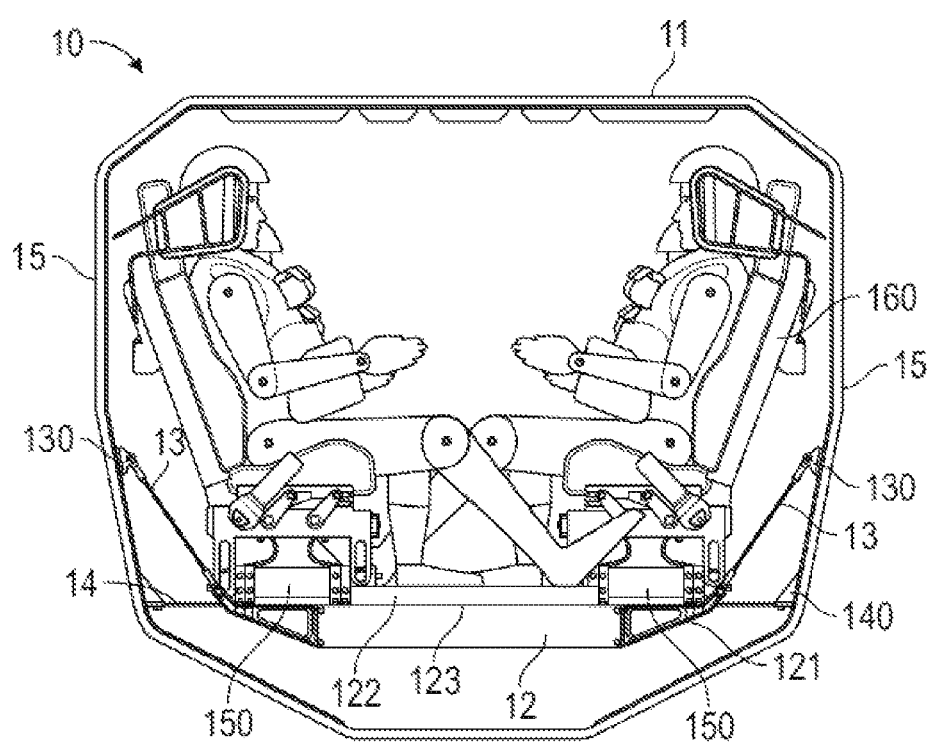
FIG. 2 is a schematic of a cross-section of an exemplary vehicle hull with a suspended floor assembly.

Referring to FIGS. 1 and 2, an exemplary vehicle structure is shown as hull 10. Exemplary floor assembly 12 is not directly rigidly affixed to walls 15 of the vehicle hull 10. Rather, in this non-limiting example, floor assembly 12 is suspended from hull 10 by at least one suspension arm 13 attached to a wall 15 or a ceiling 11 of the hull 10 by at least one mount 130. Mounts 130 are positioned above a location where suspension arm 13 connects with floor assembly 12. Other configurations are contemplated, including but not limited to configurations where no mounts 130 are used and suspension arms 13 connect with the walls 15 of vehicle hull 10 through, for example, a spherical joint.

Floor assembly 12 may be in mechanical communication with hull 10 through yaw plane energy absorbers 14. In the depicted non-limiting example, a yaw plane energy absorber 14 may be connected to walls of the hull 10 through at least one mount 140. In at least some embodiments, yaw plane energy absorbers 14 are not in direct physical contact with suspension arms 13. That is, there may be a partial decoupling of energy absorption achieved through suspension arms and yaw plane energy absorbers, which may provide advantageous results. The decoupling is partial because, although the parts are not in direct physical contact, they are in mechanical communication with one another. It is contemplated that one wholistic part or a combination of parts could function to absorb energy in a yaw plane and to also absorb energy vertically from a separate physical location in the same part or with a different part. That is, it is further contemplated that the wholistic part or combination of parts may provide a partial decoupling benefit, regardless if monolithically made or if assembled. One non-limiting way to achieve this result may be, for example, having one region of a monolithic component charged with the function of vertical energy absorbing and another region charged with yaw plane energy absorbing.

Floor assembly 12 may be configured to support a plurality of seats 160 through connection with or integral formation with a plurality of seat supports or mounts 150. It is also contemplated that seats may be supported, in whole or in part, by the hull 10 or other vehicle structure. Seats 160 may be staggered relative to a seat in a facing row, thereby offering a vehicle a narrow profile. Floor assembly 12, as depicted, includes truss ends 121, blast mat 122 and sheet decking 123. Different variations and configurations may include some or all of exemplified floor assembly 12 components. Additional components are contemplated, such as spall liners, blast mitigation spray coatings and anti-ballistic linings.

Optional components for hull 10 may include a sacrificial lower hull 200, which can include or be attached to a blast deflector which may also be sacrificial.

Figure 3:
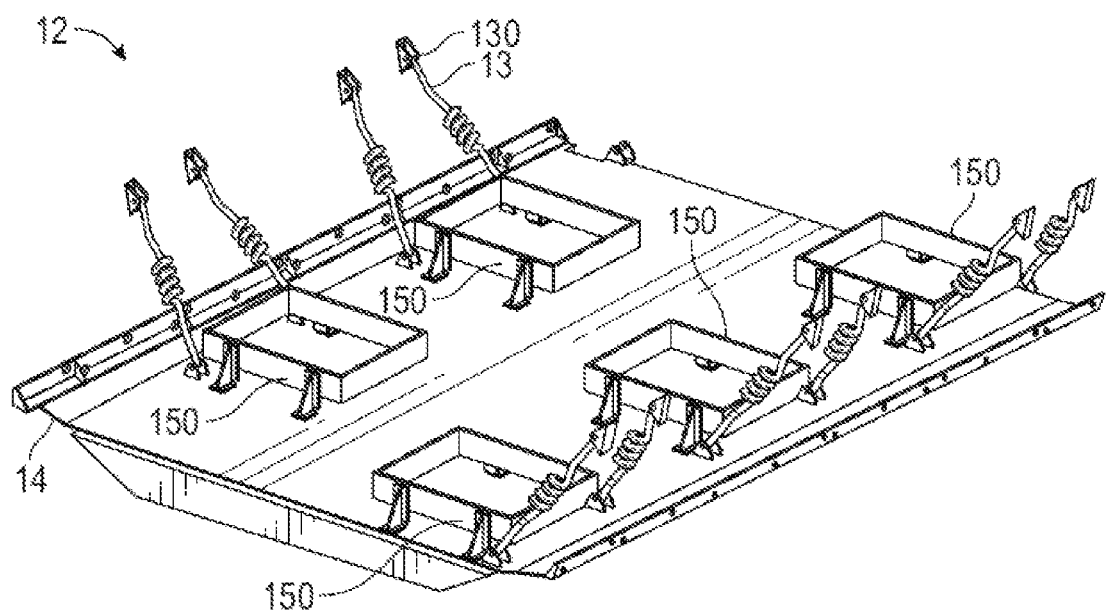
FIG. 3 is a perspective view of an exemplary floor assembly.
Figure 4A:
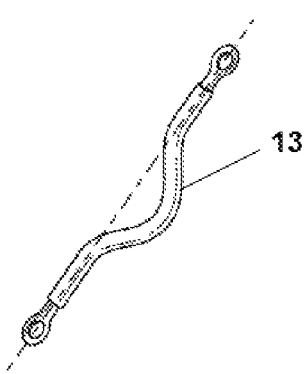
FIGS. 4A-4K identify exemplary energy damping devices.
Figure 4B:
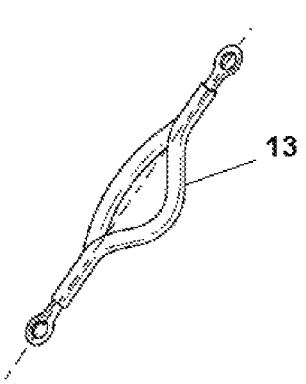
Figure 4C:
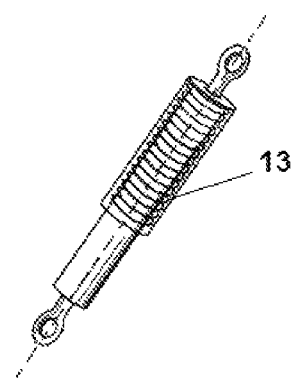
Figure 4D:
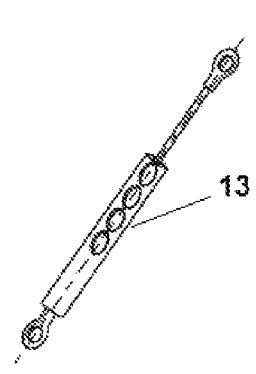
Figure 4E:
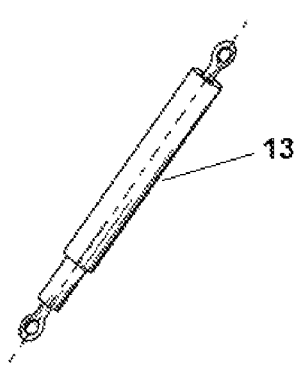
Figure 4F:
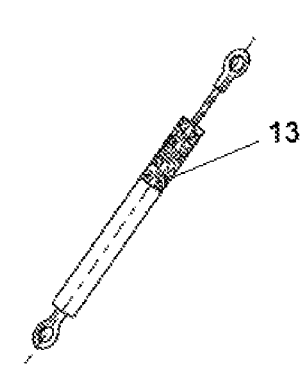
Figure 4G:
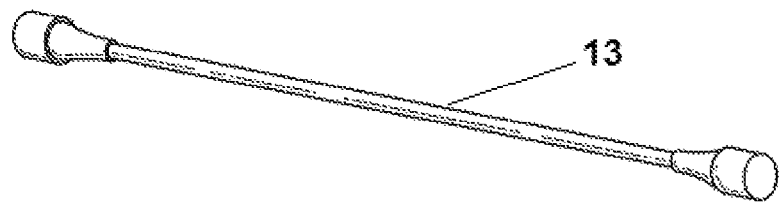
Figure 4H:
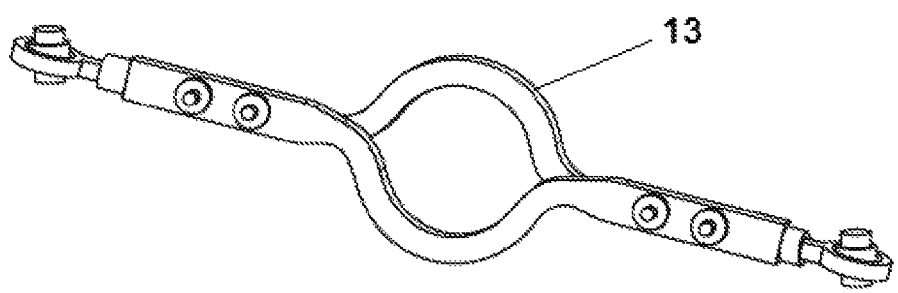
Figure 4I:
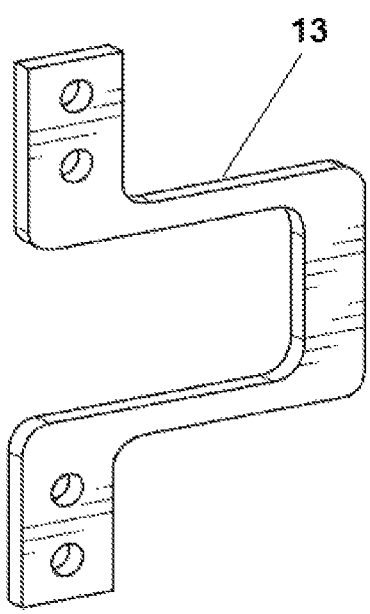
Figure 4J:
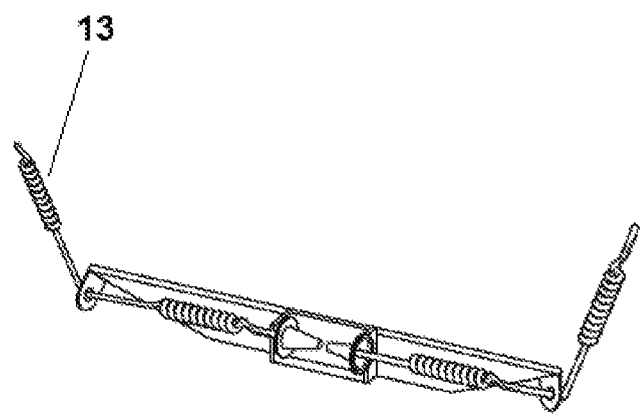
Figure 4K:
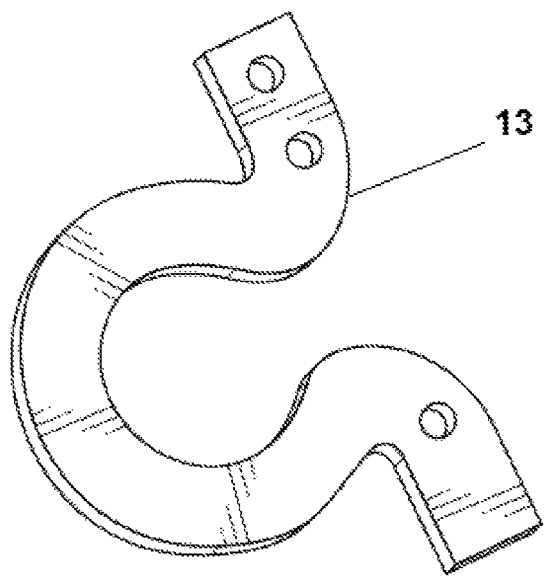

Referring to FIG. 3, an exemplary and non-limiting floor assembly 12 is shown with a plurality of pairs of suspension arms 13 and yaw plane energy absorbers 14. Each in the pair of suspension arms 13 is positioned to be on an opposite side of a seat 160 from the other in the pair. Although any number of physical arrangements are contemplated, the depicted embodiment shows suspension arms 13 being disposed such that, for any pair affiliated with a particular seat, suspension arms 13 are closer together at their top portions (at or near mounts 130) than they are at their bottom portions (at or near floor assembly 12). The positioning of seats in floor assembly 12, shown by the placement of seat supports or mounts 150, is staggered. This may permit more comfort for occupants, greater safety or survivability for occupants in a blast event, easier ingress and egress with seat pans being foldable. This arrangement may also permit the vehicle as a whole to take on a more narrow profile and therefore be a smaller target for enemy fire.

Suspension Arms

Any number of structures may be suitable suspension arms 13. FIG. 4, which illustrates an array of energy dampers, also includes a non-limiting array of potential suspension arms 13 (4a, 4b, 4c, 4d, 4e and 4f) that are contemplated for use with the disclosed vehicles. Assemblies may include tube-in-tube configurations (e.g. FIG. 4E), coil springs (e.g. FIG. 4C), crushable material, and the like. Combinations are contemplated, as well as other variations not specifically drawn.

Suspension arms 13 may be energy absorbing and include an extendable portion in its structure, which may add predictability in deformation during a blast event. Extendable portions may be less subject to unstable buckling modes, densification at extreme compression, binding or high friction from misalignment, and premature failure. Exemplary structural portions having an extendable portion include, but are not limited to, hydraulic dampers, magneto rheological damper, friction dampers, wire benders (e.g. FIG. 4B), bumpers, inversion tubes, and coil spring absorbers (e.g. FIG. 4C).

Suspension arms 13 may also include other damping elements in their structure, including other extendable dampers. Such suspension arms 13 and other damping elements may be hydraulic, pneumatic, magneto-rheological, electronic, other or combination. FIGS. 4C-4F illustrates a non-limiting array of potential dampers. The embodiment of FIG. 4J may be useful in partial decoupling applications due to the nature and configuration of its mechanical linkages. Non-limiting dampers include tension rods (e.g. FIG. 4G), double C-dampers (e.g. FIG. 4H), honeycomb crushable metal, U damper (e.g. FIG. 4J), bottle jack, suspended cables, roller/former dampers, inversion tubes, crush cones, modified U-dampers and C-dampers (e.g. FIG. 4K).

Possible cross sections for tubes or rods in a suspension arm 13 may include a hollow or solid circle, oval, square, rectangle, I-beam, to name a few. Pre-curved shapes may be included in the structure.

The suspension arms 13 may comprise any of a number of materials and combinations of materials. In some embodiments, the materials comprise one or more of stainless steel such as annealed 304 stainless steel, reinforced metal, or other plastically deformable materials of suitable specific energy, elongation properties and fatigue-to-yield ratio.

Yaw Plane Energy Absorbers

Figure 5:
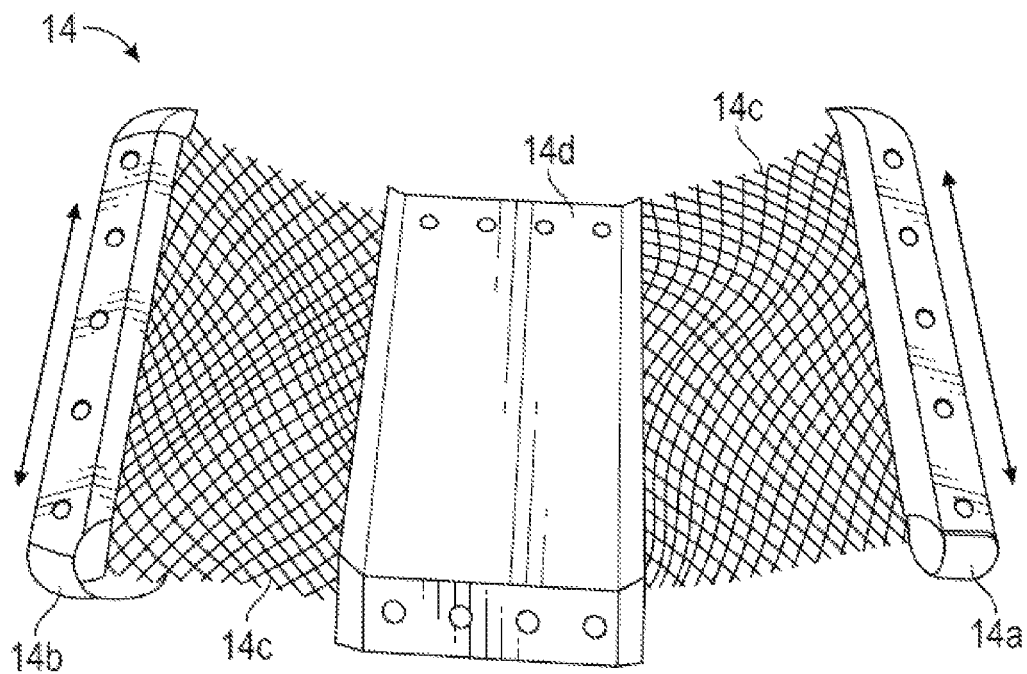
FIG. 5 identifies an exemplary shear panel.

Referring to FIGS. 2, 3 and 5, exemplary yaw plane energy absorbers 14 are shown as shear panels attachable to a hull 10 through one or more hull mounts 140. Such shear panels absorb energy when walls 15 of a hull 10 move inwardly and outwardly relative to one another as a result of a blast, for example. A single yaw plane energy absorber 14 may run the length of each side of hull 10, or there may be several disposed along the length of each side of hull 10. Yaw plane energy absorbers 14 may include panels that are entirely or have portions that are perforated, slotted, curved and/or bent in any of a number of configurations.

An exemplary configuration is shown in FIG. 5. The yaw plane energy absorber 14 is a structure with end portions 14a and 14b that are attachable to either the floor assembly 12 or mount 140. Mid-portions 14c have an energy absorbing structure capable of twisting and or other 3-D deformation. Such structure can be crushable metal, honeycomb metal, or other material configured for plastic deformation. Central portion 14d, between mid-portions 14, separates the energy absorbing mid-portions 14c. This separation may permit for greater isolation as blasts energy dissipates in different directions. The mid-portions 14c may be joined with central portion 14d through any manner of attachment, including welding and/or mechanically fastening. Exemplary yaw plane energy absorbers 14 may be made from any of a number of materials. In some embodiments, the material may comprise stainless steel, reinforced metal, or other plastically deformable materials of suitable strength.

Although the steps of the above-described processes have been exemplified as occurring in a certain sequence, such processes could be practiced with the steps performed in a different order. It should also be understood that certain steps could be performed simultaneously, that other steps could be added, or that certain steps could be omitted. In other words, the descriptions of the processes are provided for the purpose of illustration, and should not limit the claimed invention.

Mounts

If mounts 130 and 140 are used to attach suspension arms 13 and/or yaw plane energy absorbers 14 to the vehicle, such mounts 130 and 140 may be of the same material and/or structure or may be different in one or more of material and structure. In one embodiment, mount 130 is flexible mounting apparatus having a flexible mount structure, including but not limited to spherical joints or bushings on one or both ends of suspension arm 13. In one embodiment of mount 130, also considered a flexible mounting apparatus, mount 130 is of a fixed mount structure but comprises a material with lower stiffness in non-stroking directions, such as rotations and translations. Any number of materials may provide the lower stiffness. Without being bound by theory, it is believed that flexible mounting apparatus reduce moments and permit their corresponding energy absorbers to behave in a more predictable manner during a blast event.

It is contemplated that mounts 130 may be flexible mounting apparatuses and that mounts 140 may be fixed mounting apparatus. It is also contemplated that both mounts 130 and 140 are flexible mounting apparatuses having the same or different structure and/or materials.

Validated Simulation Predicted Results

Exemplary hull 10 configurations were tested to assess potential injuries in central and offset blast events. Both center blast and offset blasts were analyzed, as is reflected qualitatively in FIGS. 6 and 7. Predicted injuries were lower than injury assessment reference values.

The results of the computer modeling predict that all injuries for all occupants in the samples configured as described are reduced compared to a target, which exceeds expectations. These results exceeded goals for lower extremity injuries, suggesting the hull 10 configurations may bring increased survivability to occupants subjected to blast events. Partially decoupled energy absorbers may lead to this advantageous result.

Accordingly, it is to be understood that the above description is intended to be illustrative and not restrictive. Many embodiments and applications other than the examples provided would be apparent upon reading the disclosure. For example, yaw plane energy absorbers can be contiguous from end to end or can have separators or spacers between energy absorbing sections. The scope of the invention should be determined with reference to the appended claims along with the full scope of equivalents. It is intended that future developments will occur, and that embodiments of the disclosed systems and methods will incorporate and be incorporated with such future developments.

Use of singular articles such as "a," "the," "said" together with an element means one or more of the element unless a claim expressly recites to the contrary.

What is claimed as new and desired to be protected by Letters Patent of the United States is:

1. A vehicle, comprising:
   at least one suspension arm supporting a floor assembly in the vehicle; and at least one yaw plane energy absorber between the floor assembly and a wall of the vehicle.
2. The vehicle of claim 1, wherein the suspension arm and yaw plane energy absorber are a monolithic component with a vertical energy absorbing region partially decoupled from a yaw plane energy absorbing region.
3. The vehicle of claim 1, wherein the suspension arm and yaw plane energy absorber are separate components in mechanical communication with one another.
4. The vehicle of claim 1, wherein the suspension arm comprises an extendable portion.
5. The vehicle of claim 4, wherein the extendable portion comprises at least one of a hydraulic damper, a pneumatic damper, a magneto-theological damper, a friction damper, a wire bender, a bumper, an inversion tube, and a coil spring.
6. The vehicle of claim 1, wherein the suspension arm is partially decoupled from the yaw plane energy absorber.
7. The vehicle of claim 1, wherein at least one yaw plane energy absorber comprises a shear panel.
8. The vehicle of claim 7, wherein the shear panel comprises a deformable metal panel.
9. The vehicle of claim 8, wherein the deformable metal panel is slotted or perforated.
10. The vehicle of claim 7, wherein the shear panel is shaped to include a curve or a bend.
11. The vehicle of claim 1, wherein the suspension arm is mounted to the vehicle by a flexible mounting apparatus.
12. The vehicle of claim 1 further comprising a sacrificial blast deflector.
13. A military vehicle, comprising:
    a hull;
    a floor assembly suspended from the hull;
    at least one suspension arm connecting the floor assembly to the hull; and
    a yaw plane energy absorber between the floor assembly and the hull.
14. The military vehicle of claim 13, wherein the suspension arm comprises an extendable portion.
15. The military vehicle of claim 14, wherein the extendable portion comprises at least one of a hydraulic damper, a magneto-theological damper, a friction damper, a wire bender, a bumper, an inversion tube, and a coil spring.
16. The military vehicle of claim 13, wherein the suspension arm is partially decoupled from the yaw plane energy absorber.
17. The military vehicle of claim 13, wherein the yaw plane energy absorber comprises a shear panel.
18. The military vehicle of claim 13 further comprising a sacrificial blast deflector.
19. A vehicle, comprising:
    at least one extendable suspension arm supporting a floor assembly in the vehicle;
    a deformable shear panel between the floor assembly and a wall of the vehicle; and the suspension arm and the shear panel being partially decoupled.

* * * * *